May 24, 1966  N. G. KLING  3,252,330
SAMPLE SUPPLY MEANS FOR ANALYSIS APPARATUS
Filed April 1, 1964  7 Sheets-Sheet 1

INVENTOR.
NELSON G. KLING
BY Harry Cohn
ATTORNEY

May 24, 1966  N. G. KLING  3,252,330
SAMPLE SUPPLY MEANS FOR ANALYSIS APPARATUS
Filed April 1, 1964  7 Sheets-Sheet 4

INVENTOR.
NELSON G. KLING
BY
ATTORNEY

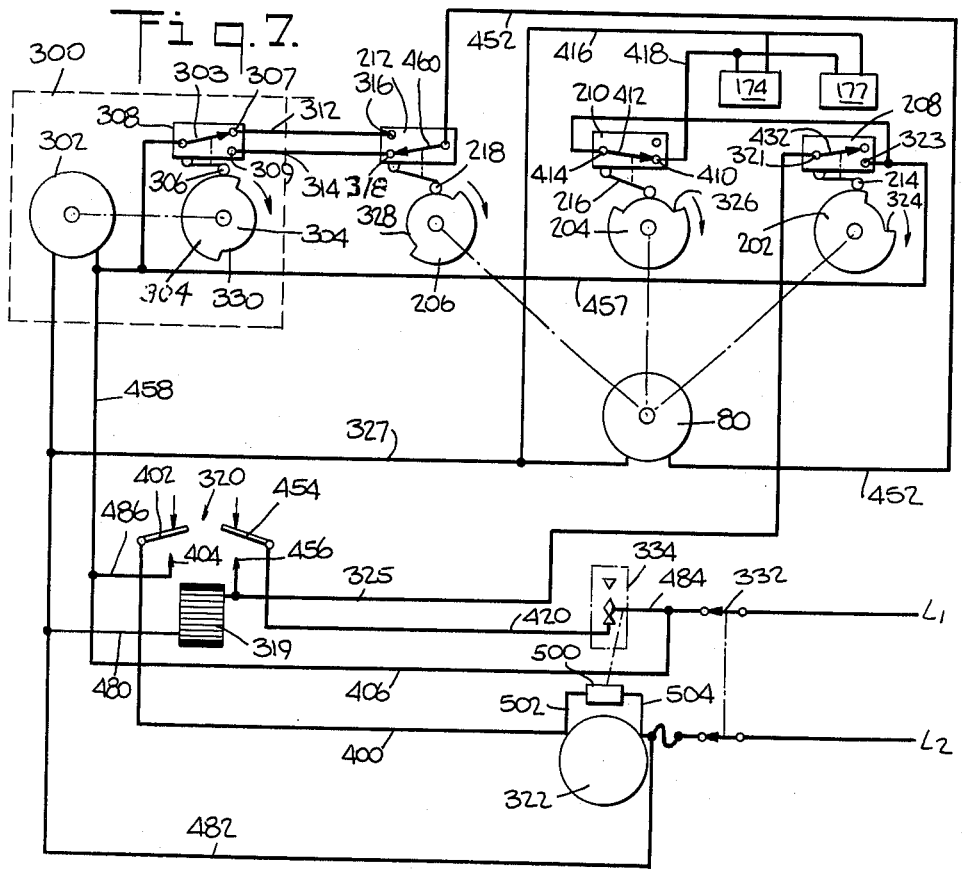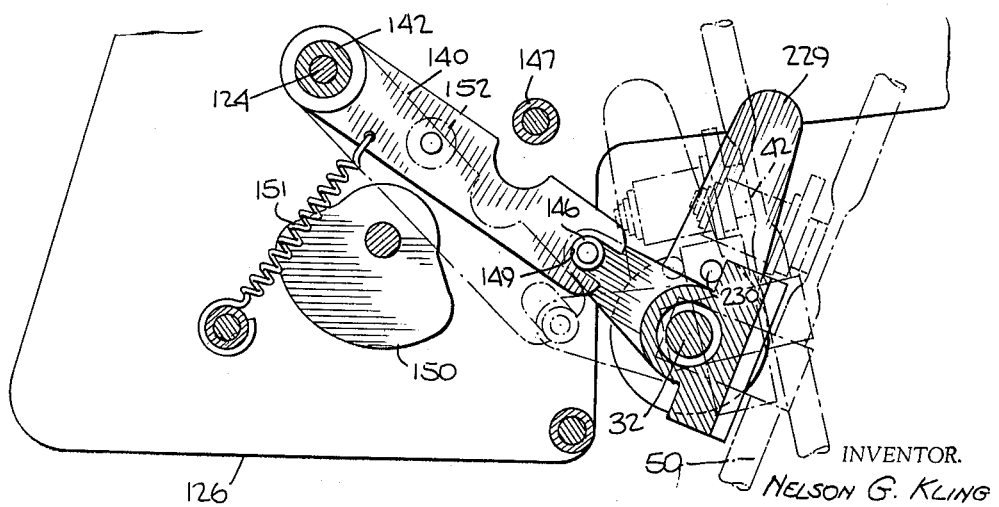

May 24, 1966 N. G. KLING 3,252,330
SAMPLE SUPPLY MEANS FOR ANALYSIS APPARATUS
Filed April 1, 1964 7 Sheets-Sheet 6
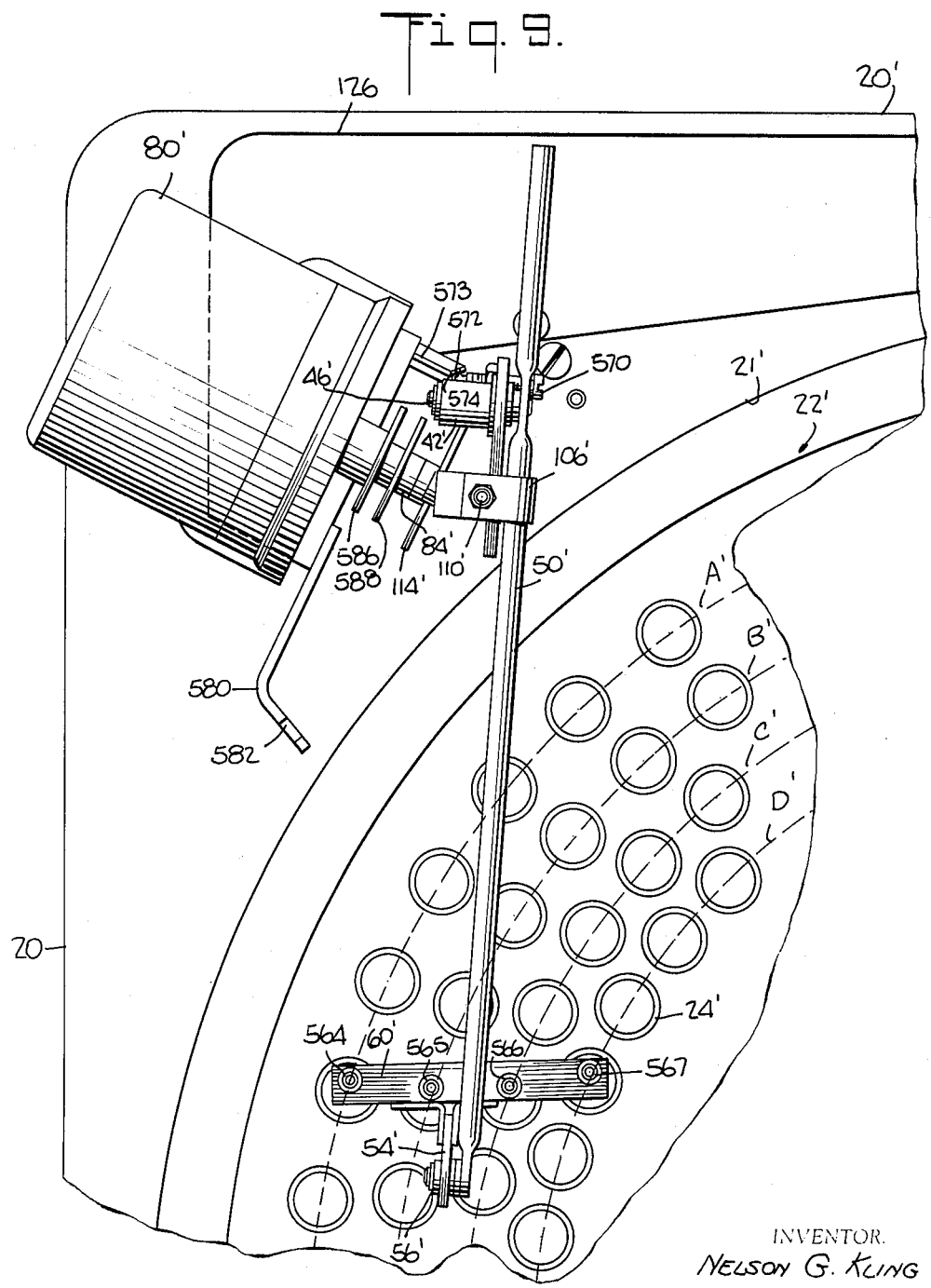
INVENTOR.
NELSON G. KLING
BY Harry Cohen
ATTORNEY May 24, 1966  N. G. KLING  3,252,330
SAMPLE SUPPLY MEANS FOR ANALYSIS APPARATUS
Filed April 1, 1964  7 Sheets-Sheet 7
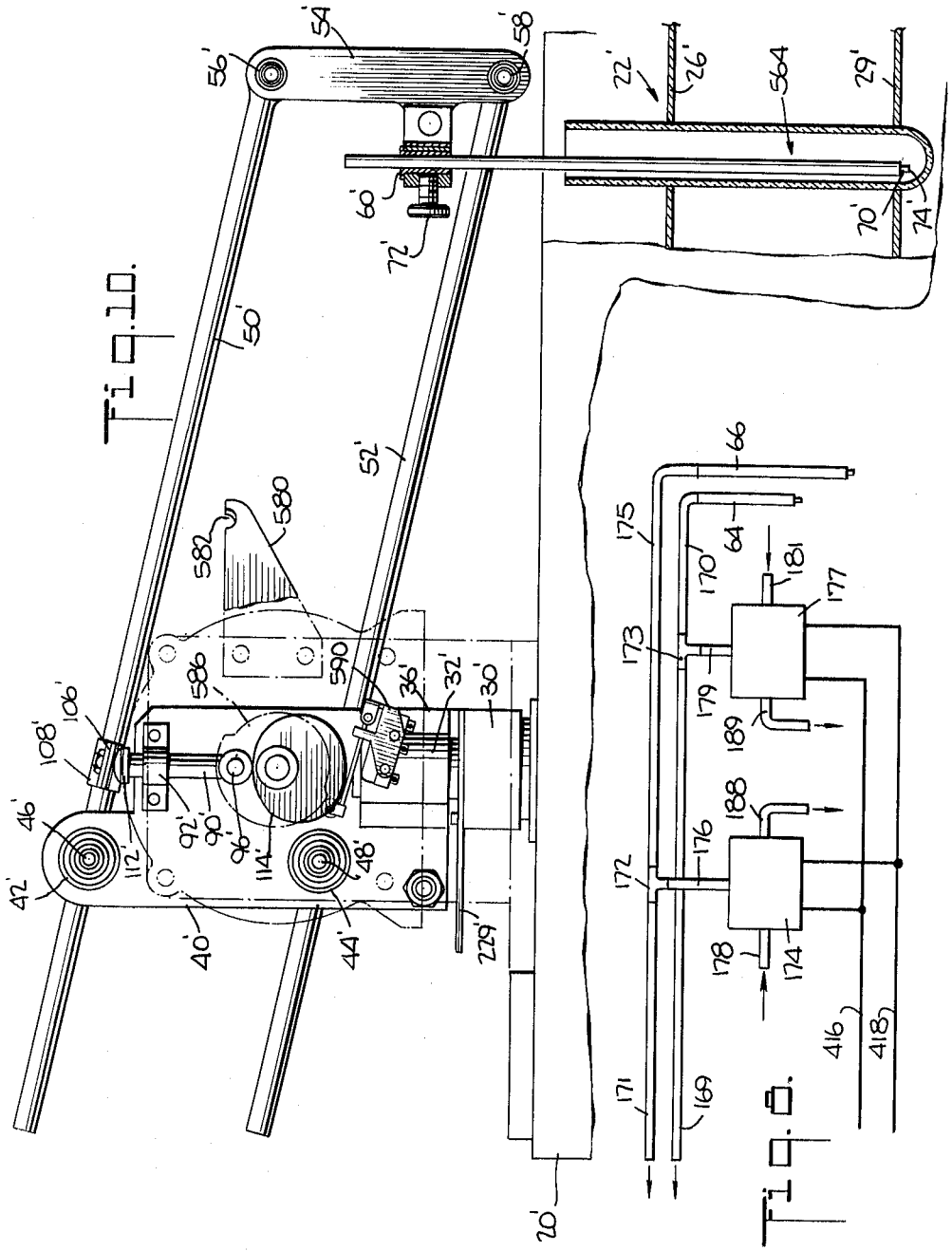
INVENTOR.
NELSON G. KLING
BY 
ATTORNEY United States Patent Office 3,252,330
Patented May 24, 1966

3,252,330
SAMPLE SUPPLY MEANS FOR ANALYSIS
APPARATUS
Nelson G. Kling, 43 Valley Road, Ringwood, N.J.
Filed Apr. 1, 1964, Ser. No. 356,597
25 Claims. (Cl. 73—423)

This invention relates to liquid supply means and, more particularly, to automatic, liquid sample supply apparatus for supplying a plurality of discrete liquid samples, in a continuous stream thereof, to associated sample analysis apparatus.

An object of my invention is the provision of sample supply apparatus of signficantly increased discrete liquid sample capacity.

Another object of my invention is the provision of sample supply apparatus including generally improved means for the automatic cleansing thereof following the supply of each discrete liquid sample, whereby contamination of a said sample by the residue of a previously supplied sample is effectively inhibited.

A further object of my invention is the provision of sample supply apparatus which make possible the utilization of many of the basic structural components utilized in fraction collection apparatus of the nature disclosed in U.S. Patent No. 2,654,522, to thus reduce the over-all cost of the said sample supply apparatus.

A still further object of my invention is the provision of sample supply apparatus of generally improved design and construction requiring only the use of readily available structural components of proven dependability to provide long periods of accurate and maintenance-free operation.

A still further object of my invention is the provision of liquid sample supply apparatus which are particularly, though not exclusively, adapted for use in the supply of a continuous stream of discrete blood samples to automatic blood sample analysis apparatus of the nature disclosed in the copending U.S. patent application, Serial No. 298,762, of Milton H. Pelavin et al., filed July 30, 1963, now Patent No. 3,196,449, and assigned to the assignee hereof.

In a preferred embodiment herein disclosed, generally circular turntable means are provided to support a large plurality of discrete liquid sample containers in a plurality of generally circular rows arranged at different radii on the surface thereof. Automatic sample pickup and supply means are positioned adjacent the said turntable means and are movable in turn into and out of each of the said sample containers, on a row by row basis, as the said turntable is periodically indexed relative thereto, to withdraw the said discrete liquid samples from the said containers of each of said rows and supply the former, in a continuous stream, to associated liquid sample analysis apparatus. Automatic cleansing means, including a wash liquid and means to supply it to the said sample pickup and supply means, are provided and function to thoroughly cleanse the said sample pickup and supply means immediately following the withdrawal and supply thereby of each of the said discrete liquid samples to the associated automatic analysis apparatus.

The above and other objects and advantages of my invention are believed made clear by the following detailed description thereof taken in conjunction with the accompanying drawings wherein:

FIGS. 4, 5 and 6 are similar top plan views, with parts in section and portions omitted for purposes of illustration, showing the sample pickup and supply operating means of the embodiment of FIG. 1 in different operational positions thereof;

FIG. 7 is a combined schematic and diagrammatic illustration of a control circuit adapted for utilization in conjunction with the embodiment of FIG. 1;

FIG. 8 is a diagrammatic illustration of the flow system of the embodiment of FIG. 1;

FIG. 9 is a top plan view of a second embodiment of the invention, and

FIG. 10 is a side plan view of the embodiment of FIG. 9.

Figure 1:
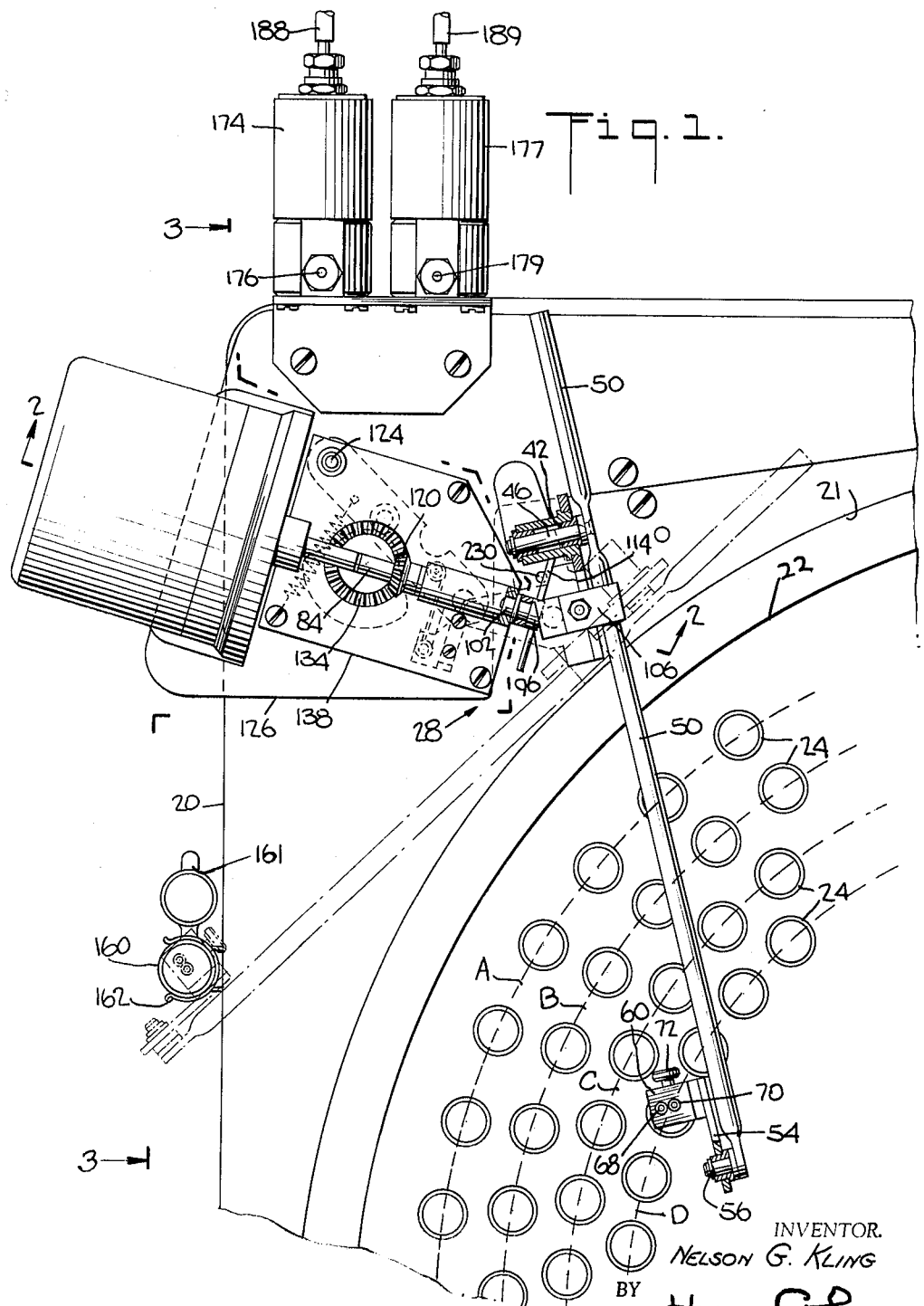
FIG. 1 is a top plan view, with parts in section and portions omitted for purposes of illustration, of a first embodiment of the sample supply apparatus of my invention.
Figure 2:
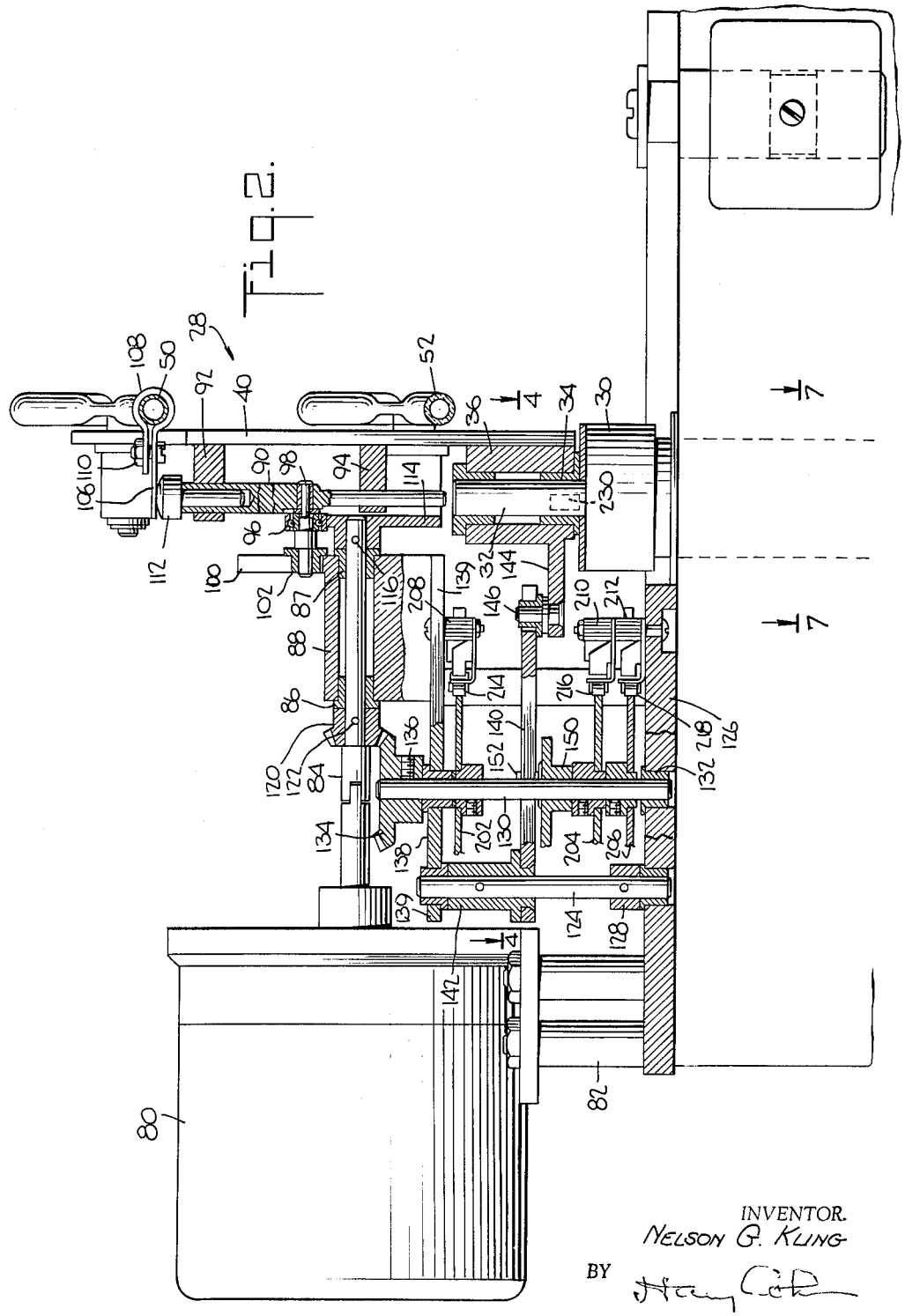
FIG. 2 is a vertical sectional view taken along line 2—2 of FIG. 1.
Figure 3:
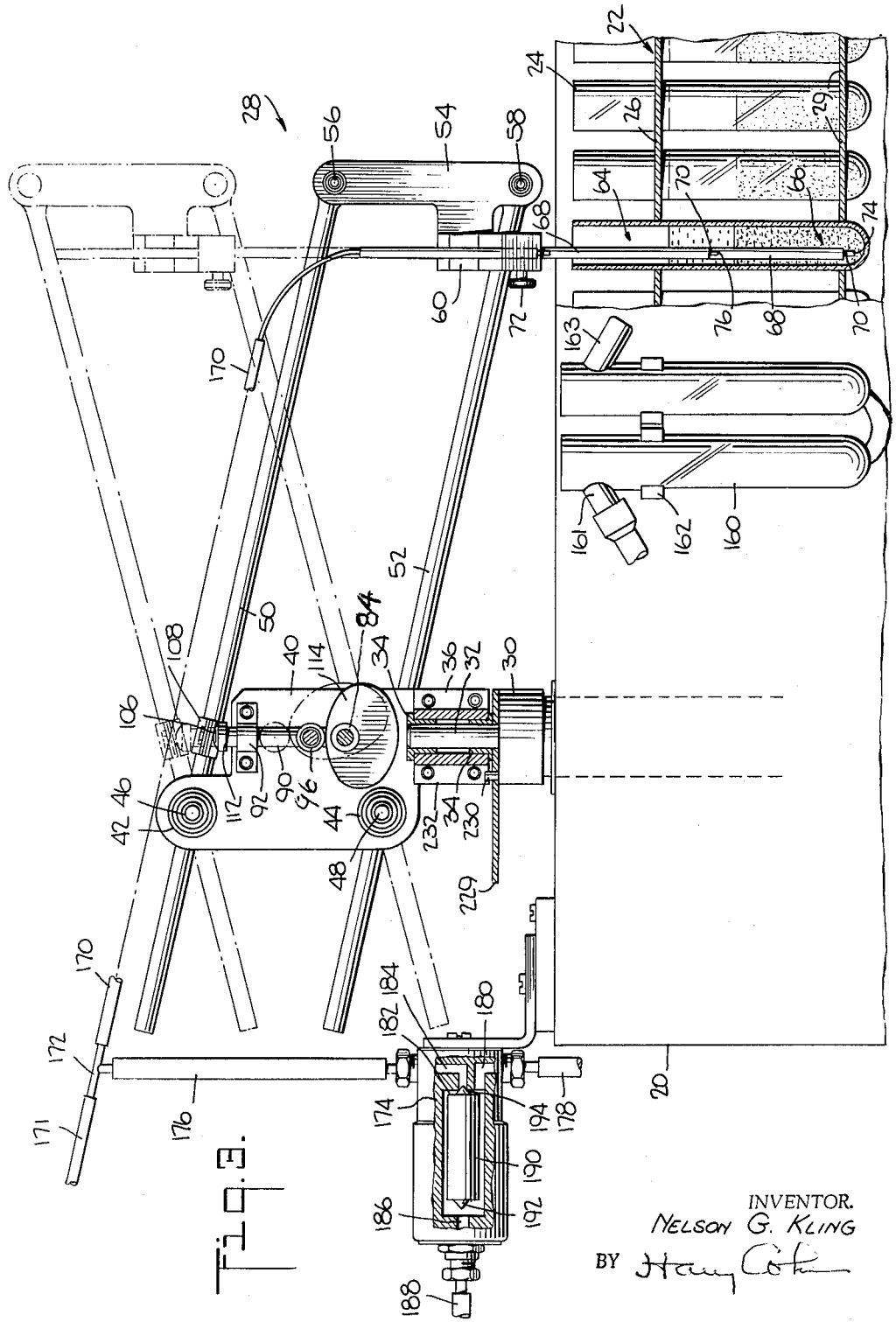
FIG. 3 is a vertical sectional view taken along line 3—3 of FIG. 1.

Referring now to FIGS. 1, 2 and 3, the sample supply apparatus of my invention may be seen to comprise a housing 20 including a generally circular aperture 21 formed therein and within which is positioned as shown a generally circular turntable 22. A plurality of generally circular rows of apertures are formed in the surface of the said turntable, and a complimentary shaped sample liquid container 24 positioned as shown (FIG. 3) within each of the said apertures of each of the said rows. Preferably, but not necessarily, the said turntable comprises upper and lower support plates 26 and 29, respectively, relatively positioned as shown in any convenient manner with the said sample liquid containers 24 extending therebetween.

A sample pickup and supply device is generally indicated at 28, and is positioned directly adjacent the said turntable 22 on the housing 20. In the herein-disclosed preferred embodiment, the said turntable includes four generally circular rows of liquid sample containers supported thereon and identified as A, B, C, and D, respectively, in FIG. 1; and is substantially identical in design and construction to the turntable disclosed in U.S. Patent No. 2,654,522. In operation, the said turntable is periodically indexed, in a manner made clear in U.S. Patents Nos. 2,604,248 and 2,710,715, to position each sample container 24, of each of said container rows, adjacent the inlet end of the sample pickup and supply device 28 for withdrawal of the sample therefrom by the latter. Thus, with four rows of sample containers 24, turntable 22 would, of necessity, be indexed through four complete revolutions thereof to properly position each of the sample containers in turn for withdrawal of the liquid samples therefrom.

Referring now to the sample pickup and supply device 28, the same comprises a support post 30 which extends, as shown, upwardly from the housing 20, in the manner best seen in FIG. 2, and is rotatable relative thereto through a predetermined arcuate range in a manner described in detail in the said U.S. Patent No. 2,654,-522. A shaft 32 extends from the extremity of the said support post, and includes bushings 34 rotatably journalled thereon in the depicted manner. A hub 36 is fixably secured to the said bushings in any convenient manner so as to be rotatable therewith relative to shaft 32, and a generally elongated support bracket 40, shaped as best seen in FIG. 3, secured in turn in any convenient manner to the said hub.

Bearing assemblies 42 and 44 are positioned at spaced points on the said support bracket 40 in the manner best seen in FIG. 3, and shafts 46 and 48, respectively, rotatably journaled therein to extend therefrom through the said support bracket. Support arms 50 and 52 are fixedly attached in any convenient manner to the opposite extremities of the said shafts 46 and 48 to thus pivotally mount the said arms about the said bearing assemblies on the said support bracket 40. A connecting arm 54 is pivotally mounted at adjacent extremities of the said support arms 50 and 52, respectively, by pivot pins 56 and 58 extending therebetween, and a sample intake crook support assembly 60 fixedly positioned as shown on the said connecting arm. Two sample intake crooks 64 and 66, respectively, each of which comprises an outer, hollow metal tube 68 and a plastic, sample intake tube 70 positioned therewithin, are supported in apertures provided therefor in the said crook support assembly 60. Set screw 72 is provided to extend through the said crook support assembly into contact with the said outer, metal tubes to maintain the crooks in the desired positions thereof relative to the said crook support assembly. In the preferred embodiment herein disclosed, the said crooks 64 and 66 are relatively positioned in the said crook support assembly 60 so that the respective intake ends of the plastic intake tubes of the crooks are positioned at different levels within the said liquid sample containers 24 when the said crooks are positioned therein. Thus, as best seen in FIG. 3, the intake end 74 of crook 66 is positioned almost at the bottom of sample container 24, while the intake end 76 of crook 64 is positioned midway along the said container. This is to enable the withdrawal by the said crooks of different segments of liquid sample contained within the said containers for reasons set forth in detail hereinbelow.

Electric drive motor 80 is positioned on housing 20 by support members 82 extending therebetween. Drive shaft 84 extends as shown from the said drive motor and is journalled for rotation in bearings 86 and 87 which are in turn supported from the main housing 20 by support bracket 88. Support arm actuator shaft 90 is slidably positioned as shown relative to support bracket 40 by bearing blocks 92 and 94 extending therebetween. The actuator shaft is movable in the vertical direction relative to the said support bracket, and includes a cam follower 96 rotatably attached thereto by stepped shaft 98 extending therebetween. A guide slot 100 is formed in an adjacent portion of support member 88, and a guide roller 102 is rotatably supported on the said stepped shaft and positioned as shown in the said guide slot. A shoe 106, which comprises a bent-over strip of metal 108, is affixed to support arm 50 by fastening assembly 110 in the manner best seen in FIG. 2, and an actuator member 112 provided to extend from actuator shaft 90 into contact with the said shoe 106.

A lift cam 114, shaped as best seen in FIG. 3, is attached as shown to the extremity of drive shaft 84 by a screw 116 extending therebetween. The cam may be seen to cooperate with cam follower 96 whereby may be appreciated that rotation of the said cam will result in reciprocation of the said follower 96 to in turn result in corresponding reciprocation of the actuator shaft 90 and actuator member 112 attached thereto. This will in turn result in corresponding reciprocation of shoe 106 whereby the generally parallelogram-like assembly of support arms 50 and 52 and crook support assembly 60 will be moved between the position thereof depicted in solid lines in FIG. 3 to the position thereof depicted in dashed lines in the said figure. This will, of course, result in reciprocation of the sample intake crooks 64 and 66, respectively, into and out of the liquid sample container 24 at that time positioned thereunder. Thus may be understood whereby the said crooks may be raised from a sample container after the withdrawal of the liquid sample therefrom to allow advancement of the turntable 22 one container position, and later positioned within the next succeeding sample container for the withdrawal of the liquid sample therefrom.

A beveled pinion gear 120 is attached as shown to drive shaft 84 by a set screw 122 extending therebetween. A support shaft 124 is supported from base plate 126 of housing 20 by collar 128 positioned therebetween as best seen in FIG. 2, and a driven shaft 130 rotatably journalled in the said base plate by means of bearing 132 positioned therebetween. The driven shaft 130 includes a beveled pinion gear 134 attached to the upper extremity thereof by screw 136 extending therebetween. The said gears 120 and 134 are enmeshed as shown whereby rotation of motor drive shaft 84 will result in driven rotation of shaft 130 through the said gears. Gear 134 is preferably of twice the effective diameter of gear 120 whereby the former will make one-half revolution for every complete revolution of the latter. A support plate 138 extends between support shaft 124, driven shaft 130, and support bracket 88 in a manner best seen in FIG. 1, and functions to provide support for the upper extremities of the said shafts. An actuating lever 140 is pivotally mounted at one extremity thereof on support shaft 124 by a hub 142 positioned therebetween; and hub 36 includes an integral actuating arm 144 projecting therefrom. A pivot pin 146 is utilized as shown to pivotally connect the adjacent extremities of the said actuating lever 140 and actuating arm 144 by extending from the latter into slot 149 of the former in the manner best seen in FIG. 2. Cam 150 is fixedly attached to driven shaft 130 so as to be rotatable therewith, and a cam follower 152 attached to actuating lever 140 by pin 154 extending therebetween in the manner best seen in FIG. 6. The said cam follower 152 extends into contact with the said cam 150, whereby may be understood that driven rotation of the said cam will result, through the action of cam follower 152, lever 140, pivot pin 146, actuating arm 144, hub 36 and support bracket 40, in horizontal movement of arms 50 and 52 from the position thereof, for example, depicted in solid lines in FIG. 1, to the position thereof depicted in dashed lines in the said figure. The said arms are spring biased toward the former position thereof by the action of spring 151 on actuating lever 140, and a stop post 147 provided to limit the movement of the arms in the other direction by the abutment of the said actuating lever therewith.

A wash liquid reservoir 160, including inlet 161 and outlet 163, is attached as shown to the housing 20 by attachment members 162 extending therebetween and, as best seen in FIG. 1, is positioned to coincide with the location of crooks 64 and 66 upon movement of the support arms 50 and 52 to the position thereof remote from the turntable 22, as best seen in FIG. 1. Thus may be understood whereby driven rotation of cams 114 and 150, respectively, through meshed gears 120 and 134 at a rate synchronized with the indexing operation of turntable 22, will result in movement of the sample intake crooks 64 and 66, respectively, vertically downward into a sample container 24 indexed into sample take-off position relative thereto, vertically upward out of the said container, horizontally from the position thereof above the turntable to the position thereof above the wash liquid reservoir 160, vertically downward into the said wash liquid reservoir, vertically upward out of the said wash liquid reservoir 160, for return horizontal movement to a position above the next succeeding liquid sample container 24 now indexed into sample take-off position relative thereto.

As seen in FIG. 3, a sample supply line 170 is connected to crook 64 whereby liquid samples aspirated by the said crook from the liquid sample containers 24 due to reduced pressure conditions maintained in the said line may be supplied to associated liquid sample analysis apparatus of the nature referred to hereinabove. A similar sample supply line 175 is operatively connected to crook 66 as indicated diagrammatically in FIG. 8. T-fittings 172 and 173 are interconnected as shown (FIG. 8) in lines 170 and 175, respectively, and solenoid operated valves 174 and 177 connected to the said T-fittings by lines 176 and 179 extending therebetween. Wash liquid inlet lines 178 and 181 are connected to the other sides of the said valves, and flow passages 180, 182 and 184, respectively, provided in each of the said valves to connect lines 178 and 176 through valve 174, and lines 181 and 179 through valve 177. The said valves further include additional flow passages 186 formed therein in communication with lines 188 and 189, and magnetic valve members 190 including peaked closure portions 192 and 194, respectively, each of which functions to close one of passages 186 and 184. Thus, in the position of valve 174 depicted in FIG. 3, wash liquid may be supplied under pressure to the said valve from any convenient, non-illustrated source, through line 178 and will flow therein through valve passages 180 and 182 to exit therefrom through passage 186 and line 188. With the said solenoid operated valve 174 energized to shift it to the other position thereof, namely that with peaked closure portion 192 closing off flow passage 186 and both of flow passages 180 and 184 open and in mutual communication, the introduction of wash liquid under pressure through line 178 will result in the flow thereof through flow passages 180, 182 and 184 to line 176, and the flow from the latter through T-fitting 172 to divide in the said T-fitting with a portion thereof flowing through line 170 to crook 64 to exit therefrom at the inlet end 76 of the tube 70 thereof. The other portion of the wash liquid will flow to line 171 for supply to the above mentioned automatic analysis apparatus and resultant cleansing of the lines thereof. Thus may be understood whereby concomitant positioning of the crook 64 in wash liquid reservoir 160 and energization of solenoid operated valve 174 following the aspiration of each sample portion from a sample container by the said crook, will result in a thorough cleansing of both the outside portion of the crook (due to the immersion thereof in the wash liquid flowing through the said reservoir) and the inside portion thereof (due to the reverse flow of wash liquid through the crook for discharge into the said reservoir) and of the inside portions of the lines 169 and 170. This may be seen to prevent contamination of the next sample portion by any residue of the former. The other solenoid operated valve 177 functions, in the identical manner of solenoid operated valve 174, to thoroughly cleanse crook 66 and the lines leading therefrom following the aspiration of each sample portion thereby.

Returning to FIG. 2, driven shaft 130 will be seen to further include timing cams 202, 204 and 206, respectively, fixedly attached thereto whereby may be understood that the said cams will rotate at the same rate as the said driven shaft, i.e., at one-half the speed of motor drive shaft 84. Cam operated switches 208, 210 and 212 are positioned as shown relative to the said cams on support plate 139 and base plate 126, respectively, and include actuators 214, 216 and 218 which function to open and close the said switches in precisely predetermined time relationship upon the above mentioned rotation of the said timing cams. Each of the said switches performs a distinct function in the control of the indexing operation of the turntable 22, the vertical and horizontal movement of the sample take-off and supply device 28, and the operation of the solenoid operated valves 174, 177, with each of these functions being described in detail hereinbelow in conjunction with the detailed description of the control circuit of FIG. 7.

Figure 4:
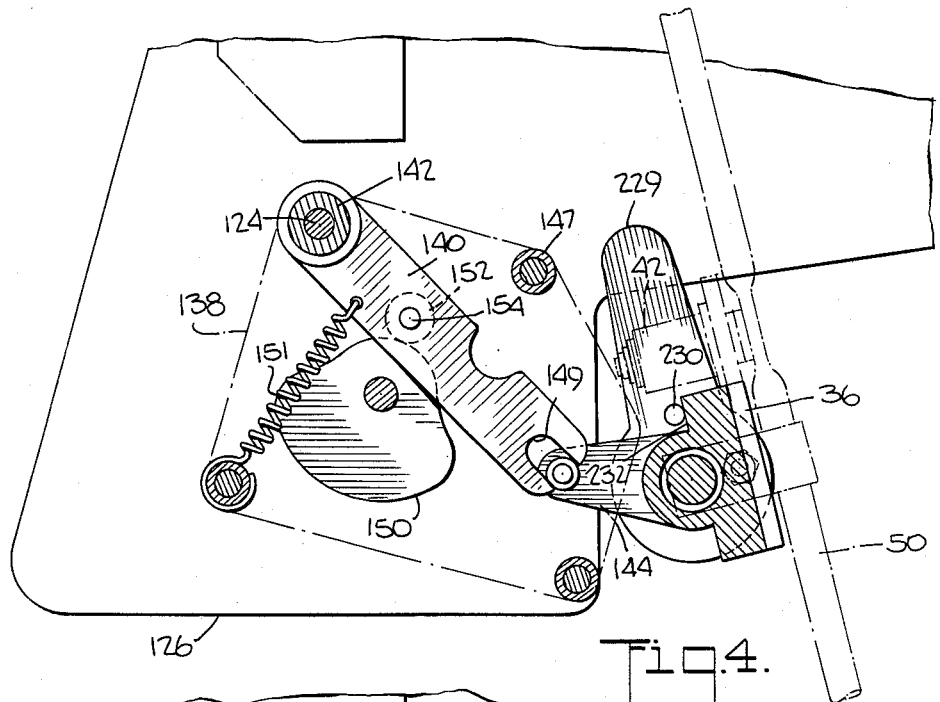
Figure 5:
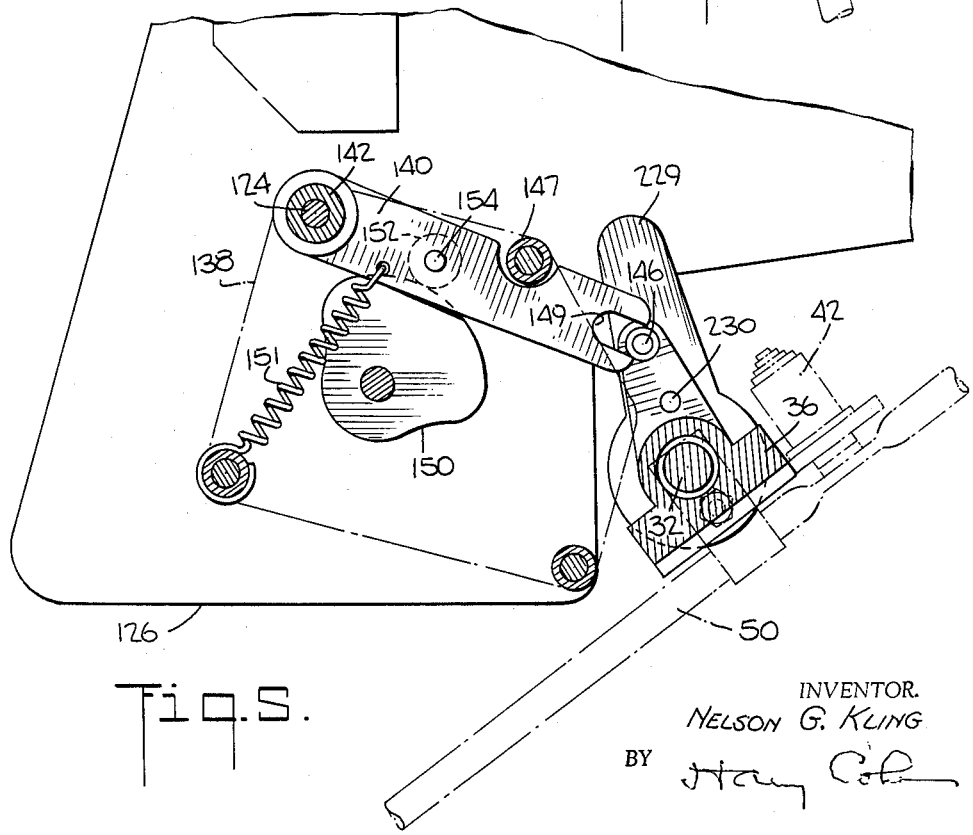

Referring again to the support post 30, a reset lever 229 is fixedly attached thereto as best seen in FIG. 3 at the upper extremity thereof. The support post further includes a stop pin 230 which projects upwardly from the said extremity thereof through the said reset lever. Thus, movement of the reset lever will result in corresponding movement of the support post and stop pin. It is the cooperative relationship, i.e., abutment, between this stop pin 230 and surface 232 of hub 36 that determines which of the rows A, B, C, or D, respectively, of the liquid sample containers 24 that the crooks 64 and 66 will be positioned over for movement thereinto to withdraw the liquid samples therefrom. Thus, with support shaft 30 rotated, in a manner described in detail in said U.S. Patent No. 2,654,522, to position the stop pin 230 as depicted in FIGS. 1 and 4, the abutment between the said stop pin and hub surface will result in arms 50 and 52 being positioned so that crooks 64 and 66 are directly over the liquid sample containers 24 of the innermost row of the said containers, i.e., row D. Alternatively, with the said stop pin positioned as depicted in FIG. 6, the said abutment will result in the said arms 50 and 52 being positioned so that the said crooks are directly above the liquid sample containers 24 of the outermost container row, i.e., row A. Positioning of stop pin 230 between the positions thereof depicted in FIG. 4 and FIG. 6 will, of course, result in the positioning of the said crooks over the liquid sample containers of container rows B and C, respectively. With cam 150 and cam follower 152 relatively positioned as shown in FIG. 5, actuating lever 140, stop shaft 147, and actuating arm 144 will cooperate to position arms 50 and 52 as indicated in FIG. 5 so that the said crooks are directly above the wash liquid reservoir 160 in the manner indicated in dashed lines in FIG. 1. Thus may be understood whereby one complete rotation of the cam 150 from the position thereof depicted in FIG. 5 will result in horizontal pivotal movement of the arms 50 and 52, and the said crooks supported thereby, from the position of the latter directly above the said wash liquid reservoir to the position of the latter directly above the container row A, B, C or D determined by the position of stop pin 230 and the abutment thereof with hub surface 232 in the hereinabove described manner. Concurrent rotation of lift cam 114 will, of course, result in up and down movement of the said crooks into and out of the said wash liquid reservoir and liquid sample containers, respectively, it being noted that the greater rotational speed of cam 114, namely twice that of cam 150, and the respective shapes of the said cams as made clear in FIGS. 3 and 4, will result in the crooks 64 and 66 being moved up and down relative to the said wash liquid reservoir and liquid sample container at the same time as the said crooks are positioned thereabove by movement of arms 50 and 52. Thus may be understood whereby alternative slugs of liquid sample from the said liquid sample containers 24, and wash liquid from lines 176 and 179, may be supplied to associated liquid sample analysis apparatus in the manner referred to hereinabove through supply lines 169 and 173.

Referring now to the control circuit of FIG. 7, it may be seen to include micro-switches 208, 210 and 212, respectively, interconnected as shown and actuated by cams 202, 204 and 206, each of which is driven from motor 80 in the manner made clear by FIG. 2 and described in detail hereinabove. A timer is generally indicated at 300, and comprises a constant speed motor 302 which drives a timing cam 304 to periodically open and close microswitch 308 through the cooperation of the said cam with microswitch actuator 306. Stationary contacts 307 and 309 of microswitch 308 are connected as shown by leads 312 and 314 to stationary contacts 316 and 318 of microswitch 212. A relay 320 is connected as shown across lines L₁ and L₂ by stationary contacts 321 and 323 of switch 208 and leads 482, 480, 325, 457, 458 and 406. Drive motor 322 is connected as shown across lines L₁ and L₂ through lead 400, movable and stationary contacts 402 and 404, respectively, of relay 320 and leads 406 and 486, and functions to drive turntable 22 in the manner referred to hereinabove. Each of timing cams 202, 204, 206 and 304 may be seen to include a notch formed in the periphery thereof, with said notches being identified in the drawings as 324, 326, 328 and 330, respectively. In the herein disclosed preferred embodiment, notch 324 is preferably of 18° extent, notch 326 of 90° extent, notch 328 of 180° extent, and notch 330 of 180° extent. The solenoid operated valves 174 and 177 are connected as shown across contacts 410, 412 and 414 of switch 210 by leads 416 and 418 extending therebetween. Pursuant to my invention, timing cam 202 and switch 208 are utilized to control in part the energization and de-energization of turntable drive motor 322 through control of coil 319 of relay 320 to thus control the indexing of the turntable 22; timing cam 204 and switch 210 are used to control the energization and de-energization of the solenoid operated valves 174 and 177, while timing cam 206 and switch 212 are utilized to control the energization and de-energization of drive motor 80 to in turn control the vertical and horizontal positioning of arms 50 and 52 and crooks 64 and 66.

Manually operable on-off switch 332 is connected as shown to control the energization of the said control circuit. A switch 334 is connected as shown between leads 420 and 484 and is periodically opened and closed by the action of the turntable drive mechanism in a manner made clear in the said U.S. Patents Nos. 2,604,248 and 2,710,715 referred to hereinabove.

With respective timing cams in the positions thereof depicated in FIG. 7, the crooks 64 and 66 will be immersed in wash liquid reservoir 160 due to the positioning of crook support assembly 60 thereover by arms 50 and 52, and solenoid operated valves 174 and 177 energized through the connected contacts 410 and 414 of closed microswitch 210 to enable the pumping of wash liquid from lines 178 and 181, through the flow passages 180 and 184 of the respective valves, through lines 176 and 179 and T-shaped fittings 172 and 173, to divide in the latter with portions thereof flowing through lines 170 and 175 in the reverse direction through the interior of the crooks 64 and 66 into wash liquid reservoir 160 to thus thoroughly cleanse the interiors of the said crooks. The other portions of the wash liquid will flow from T-shaped fittings 172 and 173 to lines 169 and 171 for the cleansing of the interiors thereof and of the connected supply lines of operatively associated sample analysis apparatus. At this point, only timing motor 302 will be energized, while cam drive motor 80, turntable drive motor 322, and coil 319 of relay 320 are de-energized, and switch 334 closed by the turntable operating mechanism in the manner made clear in the said U.S. Patents Nos. 2,604,248, and 2,710,715.

Continued rotation of timing cam 304 will result in actuator 306 of switch 308 falling into cam notch 330 to shift movable contact 303 into contact with stationary contact 309 to energize cam drive motor 80 through the said switch, switch 212, and leads 452, 327 and 482. Rotation of drive motor 80 results in corresponding rotation of lift cam 114 and cam 150 through rotation of shafts 84 and 130, respectively, but does not result in immediate movement of the arms 50 and 52, and crooks 64 and 66 up and away from the wash liquid reservoir due to the low or relatively flat surface portions of the said cams being, at this point, in contact with cam followers 96 and 152, respectively. Rotation of cam drive motor 80 also results in corresponding rotation of timing cams 206, 204 and 202 through shafts 84 and 130, respectively, in the clockwise direction as seen in FIG. 7. This results in actuator 216 of switch 210 riding out of notch 326 in cam 204 to shift movable contact 412 of the said switch away from stationary switch contact 410 and deenergize the solenoid operated valves 174 and 177, respectively. With the said valves deenergized, wash liquid will merely flow therethrough from lines 178 and 181, through valve passages 180, 182 and 186, to exhaust from the valves through lines 188 and 189. Thus, no further flow of wash liquid through the crooks 64 and 66 occurs at this point. Concurrently with the deenergization of the solenoid operated valves 174 and 177, the high or driving portions of cams 150 and 114 take effect on cam followers 152 and 96, respectively, to move the crooks 64 and 66 up and away from the wash liquid reservoir 160 and toward and into a liquid sample container 24 of whichever one of the container rows A, B, C or D is established by the position at the time of stop pin 230 as described hereinabove. Eenergization of cam drive motor 80 and attendant rotation of cams 206, 204 and 202 continue until actuator 218 of switch 212 rides out of notch 328 of cam 206 to shift movable contact 460 of the said switch from stationary switch contact 318 to stationary switch 316 to thus deenergize the cam drive motor. At this point the crooks 64 and 66 are positioned within a liquid sample container 24 in the manner depicted in FIG. 3 whereby the liquid sample is aspirated by the said crooks for supply through lines 171 to operatively associated liquid sample analysis apparatus. This continues until timing cam 304 again rotates sufficiently to enable actuator 306 of switch 308 to ride out of cam notch 330 to re-shift the movable contact 303 of the said switch to the depicted position thereof whereby cam drive motor 80 is again energized through the said switch 308 and the now connected stationary and movable contacts 316 and 460 of switch 212. At this point, the resultant driven rotation of cams 150 and 114 will immediately be effective to move the crooks 64 and 66 up and away from the liquid sample container 24 in which the same were immersed, toward and into the wash liquid reservoir 160. Concurrently therewith, actuator 460 of switch 210 again enters notch 326 of cam 204 to again energize the solenoid operated valves 174 and 177 for cleansing of the lines and crooks as described hereinabove; while actuator 430 of switch 208 falls into notch 324 of cam 202 to shift movable contact 432 of the said switch into contact with stationary switch contact 323 to complete an energization circuit for coil 319 of relay 320 through line $L_2$, switch 332, lead 482, lead 480, relay coil 319, lead 325, switch 208, lead 457, lead 458, lead 406, switch 332, and line $L_1$. This closes contacts 402 and 404, and 454 and 456, respectively, of the relay, with the closing of contacts 402 and 404 functioning to complete an energization circuit to the turntable drive motor 322 through line $L_2$, switch 332, motor 322, lead 400, relay contacts 402 and 404, lead 486, lead 406, switch 332 and lead $L_1$. The closing of relay contacts 454 and 456 functions to complete a holding circuit for the relay through line $L_2$, switch 332, lead 482, lead 480, relay coil 319, relay contacts 456 and 454, lead 420, switch 334, lead 484, switch 332 and line $L_1$.

Energization of turntable drive motor 322 functions to advance the turntable 22 one liquid sample container position through turntable drive mechanism indicated diagrammatically at 500 in a manner made clear in the said U.S. Patent Nos. 2,604,248 and 2,710,715, and continues despite the fact that actuator 430 of switch 208 soon rides out of notch 324 of cam 202 to shift movable switch contact 432 away from stationary switch contact 323, due to the action of the relay holding circuit which is completed through closed relay contacts 454 and 456, and switch 334 as discussed above. However, approximately half way through the advancement of the turntable one sample container position, the turntable drive mechanism 500 functions to momentarily open switch 334 to break the relay holding circuit and deenergize the relay. The turntable drive motor 322 remains energized from the turntable drive mechanism 500, through leads 502 and 504 in a manner made clear in U.S. Patents Nos. 2,604,248 and 2,710,715, until the turntable 22 has been advanced one sample container position, whereupon the said motor is deenergized with the respective timing cams having returned to the positions thereof depicted in FIG. 7 for repetition of the cycle.

In operation, for example, in the supply of the centrifugally separated red blood cell and plasma constituents of discrete blood samples to operatively associated automatic blood analysis apparatus of the nature disclosed in the copending U.S. patent application, Serial No. 298,762, referred to hereinabove, for the automatic determination of the respective blood types of the said discrete blood samples, each of the liquid sample containers 24 would be filled approximately half-way with a discrete blood sample and centrifuged to separate the said sample into the lighter and heavier plasma and red blood cell constituents thereof. The said containers with the thusly centrifuged blood samples contained therein are then positioned on the turntable 22, and all appropriate electrical, mechanical and flow line connections made to enable the supply of the discrete blood sample constituents to the said automatic blood analysis apparatus. The wash-liquid supply sources (not shown) are then activated to insure the flow in sufficient quantity of wash liquid through reservoir 160 and the solenoid operated valves 174 and 177.

Reset lever 229 is then manually adjusted to position stop pin 230 in the position thereof depicted in FIG. 4 whereby the abutment between the said pin and surface 232 of hub 36 will establish blood sample container row D as the first row of blood sample containers from which the blood samples will in turn be aspirated through crooks 64 and 66 for supply to the associated blood analysis apparatus.

At this point, the said crooks are positioned in the wash liquid reservoir 160 by the arms 50 and 52 which are positioned as shown in FIG. 4. Additionally, the respective timing cams are positioned as shown in FIG. 7. Operation of the apparatus is then commenced by the manual closing of switch 332 whereupon the said crooks will be moved back and forth between the wash liquid reservoir 160 and the blood sample containers 24 of row D as the latter are in turn indexed to a blood sample take-off position relative to the said crooks. This will, of course, result in alternating slugs of wash liquid and discrete blood sample constituents being supplied to the associated blood analysis apparatus, with the red blood cell constituents being supplied thereto through crook 66 and lines 175 and 171 and the plasma constituents being supplied thereto through crook 64 and lines 170 and 169. After the blood sample has been aspirated in turn from each of the said containers of row D, support post 30 is automatically turned, in the manner made clear in the said U.S. Patent No. 2,654,522, to re-position stop pin 230 so that the abutment thereof with surface 232 of hub 36 will establish row C of the blood sample containers 24 as the next container row from which the blood samples will be aspirated in turn by the said crooks. After the blood samples have been aspirated from all of the containers 24 of row C, stop pin 230 will again be automatically re-positioned by rotation of support post 30 in the manner referred to above, to establish row B of the blood sample containers as the next container row from which the blood samples will be aspirated by the crooks. Row A is next, at the completion of which operation of the apparatus is automatically terminated in the manner made clear in the said U.S. Patents Nos. 2,654,522 and 2,604,248. In practice, each of the said container rows may include fifty or more containers 24 whereby the total discrete blood sample capacity of the apparatus may be understood to total two hundred or more such samples.

Referring now to the embodiment of FIGS. 9 and 10, elements thereof which correspond with elements of the embodiment of FIGS. 1–6 are identified by the same numeral which is primed in the latter instance. Thus, for example, housing 20 of FIG. 1 is identified as 20′ in FIGS. 9 and 10, while crook support arms 50 and 52 of FIG. 3 are identified as 50′ and 52′, respectively, in FIG. 9. The embodiment of FIGS. 9 and 10 differs from the first disclosed embodiment primarily in the fact that there is no provision for a wash liquid, and the crook support arms 50′ and 52′ thus need only be moved up and down from sample container to sample container as the latter are in turn indexed relative thereto. To this effect, four crooks identified respectively as 564, 565, 566, 567 are provided, and a modified crook support assembly 60′ pivotally supported from the support arms 50′ and 52′ to in turn support the four said crooks therefrom.

A screw 570 projects as shown in FIG. 9 through support bracket 40′ and includes a ball-shaped attachment member 572 formed at the remote extremity thereof. A holding clamp 573 projects as shown from motor 80′ and includes a hole 574 of shape and size complementary to attachment member 572 formed therein. Thus may be understood whereby the said attachment member may be fitted into the said hole to maintain the said crook support assembly 60′ positioned as shown in FIG. 9, whereby each of the crooks 564, 565, 566 and 567 will be located directly above the liquid sample containers 24′ of a different container row. A support member 580 also projects from motor 80′ and includes a support notch 582 formed therein whereby the lower support arm 52′ may be supported therein when the apparatus is not in use.

Timing cams 586 and 588 are provided as shown on drive shaft 84′ and function to control the operation of the apparatus through the actuation of microswitches 590 and 592 thereby as the said cams are rotated relative thereto. This is accomplished through a non-illustrated control circuit, similar to that of FIG. 7, in which the said switches are operatively connected.

In operation, discrete liquid samples, as for example blood or the red blood cell or plasma constituent thereof, are placed in the containers, the latter positioned in the turntable 22′ in the manner described hereinabove, and the turntable indexed to in turn present the said containers in groups of four—one from each of the container rows A, B, C and D—at a sample pickup location beneath the four crooks, 564, 565, 566 and 567, respectively. As each four container groups is indexed thereunder, the said crooks are moved thereinto by rotation of cam 114′ and resultant movement of support arms 50′ and 52′, to enter the said containers and aspirate the blood, or blood constituents, therefrom. Following the expiration of a predetermined period of time, the said crooks are raised from the said container group, again by rotation of cam 114′, and a new four container group indexed thereunder through rotation of turntable 22′, whereupon the crooks may be re-lowered into the containers for repetition of the cycle.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Liquid sample supply apparatus comprising, means for supporting a plurality of liquid sample containers in each of a plurality of laterally spaced rows; a receptacle for an additional liquid positioned laterally of said support means; liquid take-off means pivotally supported laterally of said support means and movable laterally of said container rows and said receptacle to respective positions adjacent said container rows and receptacle, and from said adjacent positions into and out of the respective container or receptacle; means to relatively move said support means and said take-off means to successively position said take-off means in said positions adjacent each of said rows, to concurrently present successively the containers of the same said row to said take-off means, to dispose said take-off means into and out of the presented thereto container, and to move said take-off means laterally of said support means to said position adjacent said receptacle and therefrom into and out of said receptacle in alternation with the disposition of said take-off means into each container.

2. Liquid sample supply apparatus comprising; an indexable turntable for supporting a plurality of liquid sample containers in a plurality of concentric circular rows of different radii; a receptacle for an additional liquid positioned laterally of said turntable; liquid take-off means pivotally supported laterally of said turntable and movable laterally of said container rows and said receptacle to respective positions adjacent said container rows and receptacle and from said adjacent positions into and out of the respective container or receptacle; means to relatively move said turntable and said take-off means to successively position said take-off means in said positions adjacent each of said rows, to concurrently present successively the containers of the same row to said take-off means, to dispose said take-off means into and out of the presented thereto container, and to move said take-off means laterally of said turntable to said position adjacent said receptacle and therefrom into and out of said receptacle in alternation with the disposition of said take-off means into each container.

3. Liquid sample supply apparatus comprising, means for supporting a plurality of liquid sample containers in each of a plurality of laterally spaced rows; a receptacle for an additional liquid positioned laterally of said support means; liquid take-off means pivotally supported laterally of said support means and movable laterally of said container rows and said receptacle to respective positions adjacent said container rows and receptacle, and from said adjacent positions into and out of the respective container or receptacle; means to relatively move said support means and said take-off means to successively position said take-off means in said positions adjacent each of said rows, to concurrently present successively the containers of the same said row to said take-off means, to dispose said take-off means into and out of the presented thereto container, and to move said take-off means laterally of said support means to said position adjacent said receptacle and therefrom into and out of said receptacle in alternation with the disposition of said take-off means into each container; said liquid take-off means including a tube for the flow of liquid therethrough; first means coupled to said tube for drawing sample liquid from a container into one end of, and through said tube in one direction; and second means coupled to said tube for passing additional liquid into the other end of and through said tube in the other direction to said receptacle.

4. Liquid sample supply apparatus comprising; an indexable turntable for supporting a plurality of liquid sample containers in a plurality of concentric circular rows of different radii; a receptacle for an additional liquid positioned laterally of said turntable; liquid take-off means pivotally supported laterally of said turntable and movable laterally of said container rows and said receptacle to respective positions adjacent said container rows and receptacle and from said adjacent positions into and out of the respective container or receptacle; means to relatively move said turntable and said take-off means to successively position said take-off means in said positions adjacent each of said rows, to concurrently persent successively the containers of the same row to said take-off means, to dispose said take-off means into and out of the presented thereto container, and to move said take-off means laterally of said turntable to said position adjacent said receptacle and therefrom into and out of said receptacle in alternation with the disposition of said take-off means into each container; said liquid take-off means including a tube for the flow of liquid therethrough; first means coupled to said tube for drawing sample liquid from a container into one end of and through said tube in one direction; and second means coupled to said tube for passing additional liquid into the other end of and through said tube in the other direction to said receptacle.

5. Liquid sample supply apparatus comprising, means for supporting a plurality of liquid sample containers in each of a plurality of laterally spaced rows, liquid take-off means positioned laterally of said support means and movable laterally of said container rows to respective take-off positions relative thereto, and from said take-off positions, into and out of said containers to withdraw at least portions of said liquid samples therefrom, and means to relatively move said support means and said take-off means to position the latter in said take-off positions, in succession, relative to each of said rows, and to concurrently present the containers of the same said row, in succession, thereto for the withdrawal of the said liquid sample portions therefrom by the movement of said take-off means thereinto, said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, and a tube supported from said support member with the inlet end thereof movable into and out of said containers for the flow of said liquid sample portions therethrough in one direction during the withdrawal thereof from said containers.

6. Liquid sample supply apparatus comprising, means for supporting a plurality of liquid sample containers in each of a plurality of laterally spaced rows; a receptacle for an additional liquid positioned laterally of said support means; liquid take-off means pivotally supported laterally of said support means and movable laterally of said container rows and said receptacle to respective positions adjacent said container rows and receptacle, and from said adajcent positions into and out of the respective container or receptacle; means to relatively move said support means and said take-off means to successively position said take-off means in said positions adjacent each of said rows, to concurrently present successively the containers of the same said row to said take-off means, to dispose said take-off means into and out of the presented thereto container, and to move said take-off means laterally of said support means to said position adjacent said receptacle and therefrom into and out of said receptacle in alternation with the disposition of said take-off means into each container; said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, and a tube supported from said support member with the inlet end thereof movable into and out of said containers for the flow of said liquid sample portions therethrough in one direction during the withdrawal thereof from said containers.

7. Liquid sample supply apparatus comprising; a receptacle for an additional liquid positioned laterally of said support means; liquid take-off means pivotally supported laterally of said support means and movable laterally of said container rows and said receptacle to respective positions adjacent said container rows and receptacle, and from said adjacent positions into and out of the respective container or receptacle; means to relatively move said support means and said take-off means to successively position said take-off means in said positions adjacent each of said rows, to concurrently present successively the containers of the same said row to said take-off means, to dispose said take-off means into and out of the presented thereto container, and to move said take-off means laterally of said support means to said position adjacent said receptacle and therefrom into and out of said receptacle in alternation with the disposition of said take-off means into each container; said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, and a tube supported from said support member with the inlet end thereof movable into and out of said containers for the flow of said liquid sample portions therethrough in one direction during the withdrawal thereof from said containers.

8. Liquid sample supply apparatus comprising, means for supporting a plurality of liquid sample containers in each of a plurality of laterally spaced rows; a receptacle for an additional liquid positioned laterally of said support means; liquid take-off means pivotally supported laterally of said support means and movable laterally of said container rows and said receptacle to respective positions adjacent said container rows and receptacle, and from said adjacent positions into and out of the respective container or receptacle; means to relatively move said support means and said take-off means to successively position said take-off means in said positions adjacent each of said rows, to concurrently present successively the containers of the same said row to said take-off means, to dispose said take-off means into and out of the presented thereto container, and to move said take-off means laterally of said support means to said position adjacent said receptacle and therefrom into and out of said receptacle in alternation with the disposition of said take-off means into each container; said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, and a tube supported from said support member with the inlet end thereof movable into and out of said containers for the flow of said liquid sample portions therethrough in one direction during the withdrawal thereof from said containers, and means to flow said additional liquid through said tube in the opposite direction when the inlet end of said tube is positioned in said receptacle.

9. Liquid sample supply apparatus comprising, means for supporting a plurality of liquid sample containers in each of a plurality of laterally spaced rows, liquid take-off means positioned laterally of said support mens and movable laterally of said container rows to respective take-off positions relative thereto, and from said take-off positions into and out of said containers to withdraw at least portions of said liquid samples therefrom, and means to relatively move said support means and said take-off means to position the latter in said take-off positions, in succession, relative to each of said rows, and to concurrently present the containers of the same said row, in succession, thereto for the withdrawal of the said liquid sample portions therefrom by the movement of said take-off means thereinto, said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, and a tube supported from said support member with the inlet end thereof movable into and out of said containers for the flow of said liquid sample portions therethrough in one direction during the withdrawal thereof from said containers, said means to move said tube into and out of said containers comprising cam means rotatably supported from said support assembly, and cam follower means cooperatively associated with said generally parallelogram-like mechanism and responsive to the rotation of said cam means to pivotally move mechanism about said support assembly to in turn move said inlet end of said tube into and out of said sample containers.

10. Liquid sample supply apparatus comprising, means for supporting a plurality of liquid sample containers in each of a plurality of laterally spaced rows; a receptacle for an additional liquid positioned laterally of said support means; liquid take-off means pivotally supported laterally of said support means and movable laterally of said container rows and said receptacle to respective positions adjacent said container rows and receptacle, and from said adjacent positions into and out of the respective container or receptacle; said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, and a tube supported from said support member with one end thereof movable into and out of said containers and receptacle; and means to relatively move said support means and said take-off means including first cam means rotatably supported from said support assembly and first cam follower means cooperatively associated with said generally parallelogram-like mechanism and responsive to the rotation of said first cam means to pivotally move said mechanism about said support assembly to in turn move said one end of said tube into and out of said sample containers, second cam means rotatably supported adjacent to said support assembly and second cam follower means cooperatively associated with said support assembly and responsive to the rotation of said second cam means to rotate said support assembly to pivotally move said generally parallelogram-like mechanism about said support assembly to in turn move said tube between said take-off positions thereof relative to said containers, and said position thereof adjacent to said receptacle, and means to rotatably drive said first and second cam means at predetermined relative rates.

11. Liquid sample supply apparatus comprising, means for supporting a plurality of liquid sample containers in each of a plurality of laterally spaced rows; a receptacle for an additional liquid positioned laterally of said support means; liquid take-off means pivotally supported laterally of said support means and movable laterally of said container rows and said receptacle to respective positions adjacent said container rows and receptacle, and from said adjacent positions into and out of the respective container or receptacle; means to relatively move said support means and said take-off means to successively position said take-off means in said positions adjacent each of said rows, to concurrently present successively the containers of the same said row to said take-off means, to dispose said take-off means into and out of the presented thereto container, and to move said take-off means laterally of said support means to said position adjacent said receptacle and therefrom into and out of said receptacle in alternation with the disposition of said take-off means into each container; said liquid take-off means including a tube for the flow of liquid therethrough, first means coupled to said tube for drawing sample liquid from a container into one end of and through said tube in one direction when said one end of said tube is disposed in such container, and second means including a source of additional liquid coupled by valve means to the other end of said tube for passing additional liquid into the other end of and through said tube in the other direction to said receptacle when said tube is disposed in said receptacle.

12. Liquid sample supply apparatus comprising, means for supporting a plurality of liquid sample containers in each of a plurality of laterally spaced rows; a receptacle for an additional liquid positioned laterally of said support means; liquid take-off means pivotally supported laterally of said support means and movable laterally of said container rows and said receptacle to respective positions adjacent said container rows and receptacle, and from said adjacent positions into and out of the respective container or receptacle; means to relatively move said support means and said take-off means to successively position said take-off means in said positions adjacent each of said rows, to concurrently present successively the containers of the same said row to said take-off means, to dispose said take-off means into and out of the presented thereto container, and to move said take-off means laterally of said support means to said position adjacent said receptacle and therefrom into and out of said receptacle in alternation with the disposition of said take-off means into each container; said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, a tube supported from said support member for the flow of liquid therethrough, first means coupled to said tube for drawing sample liquid from a container into one end of and through said tube in one direction, and second means coupled to said tube for passing additional liquid into the other end of and through said tube in the other direction to said receptacle.

13. Liquid sample supply apparatus comprising means for supporting a plurality of liquid sample containers in each of a plurality of laterally spaced rows; a receptacle for an additional liquid positioned laterally of said support means; liquid take-off means pivotally supported laterally of said support means and movable laterally of said container rows and said receptacle to respective positions adjacent said container rows and receptacle, and from said adjacent positions into and out of the respective container or receptacle; said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, and a tube supported from said support member with one end thereof movable into and out of said containers and receptacle; and means to relatively move said support means and said take-off means including first cam means rotatably supported from said support assembly and first cam follower means cooperatively associated with said generally parallelogram-like mechanism and responsive to the rotation of said first cam means to pivotally move said mechanism about said support assembly to in turn move said one end of said tube into and out of said sample containers, second cam means rotatably supported adjacent to said support assembly and second cam follower means cooperatively associated with said support assembly and responsive to the rotation of said second cam means to rotate said support assembly to pivotally move said generally parallelogram-like mechanism about said support assembly to in turn move said tube between said take-off positions thereof relative to said containers, and said position thereof adjacent to said receptacle, and means to rotatably drive said first and second cam means at predetermined relative rates; first means coupled to said tube for drawing sample liquid from a container into one end of and through said tube in one direction when said one end of said tube is disposed in such container, and second means including a source of additional liquid coupled by valve means to the other end of said tube for passing additional liquid into the other end of and through said tube in the other direction to said receptacle when said tube is disposed in said receptacle.

14. Liquid sample supply apparatus comprising, means for supporting a plurality of liquid sample containers, liquid take-off means movable into and out of said containers, in succession, as the latter are moved relative thereto to withdraw at least portions of said liquid samples therefrom, said liquid take-off means comprising a support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, and a tube supported from said support member with the inlet end thereof movable into and out of said containers for the flow of said liquid sample portions therethrough during the withdrawal thereof from said containers.

15. Liquid sample supply apparatus comprising, means for supporting a plurality of liquid sample containers, liquid take-off means movable into and out of said containers, as the latter are moved relative thereto to withdraw at least portions of said liquid samples therefrom, and means to move said take-off means into and out of said containers, said liquid take-off means comprising a support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, and a tube supported from said support members with the inlet end thereof movable into and out of said containers for the flow of said liquid sample portions therethrough during the withdrawal thereof from said containers, said means to move said tube into and out of said containers comprising cam means rotatably supported from said support assembly, and cam follower means cooperatively associated with said generally parallelogram-like mechanism and responsive to the rotation of said cam means to pivotally move said mechanism about said support assembly in a generally vertical plane to in turn move the inlet end of said tube into and out of said sample containers.

16. Liquid sample supply apparatus comprising, rotary turntable means for supporting a plurality of generally circular, concentric rows of liquid sample containers thereon, liquid take-off means positioned laterally of said support means and movable laterally thereof and into and out of said containers as the latter are moved relative thereto to withdraw at least portions of said liquid samples therefrom, and means to move said take-off means into and out of said containers, said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, and a tube supported from said support member with the inlet end thereof movable into and out of said containers for the flow of said liquid sample portions therethrough during the withdrawal thereof from said containers.

17. Liquid sample supply apparatus comprising, rotary turntable means for supporting a plurality of generally circular, concentric rows of liquid sample containers thereon, liquid take-off means positioned laterally of said support means and movable laterally thereof and into and out of said containers as the latter are moved relative thereto to withdraw at least portions of said liquid samples therefrom, and means to move said take-off means into and out of said containers, said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, and a tube supported from said support member with the inlet end thereof movable into and out of said containers for the flow of said liquid sample portions therethrough in one direction during the withdrawal thereof from said containers, said means to move said tube into and out of said containers comprising cam means rotatably supported from said support assembly, and cam follower means cooperatively associated with said generally parallelogram-like mechanism of said support arms and responsive to the rotation of said cam means to pivotally move said generally parallelogram-like mechanism about said support assembly to in turn move the inlet end of said tube into and out of said sample containers.

18. Liquid sample supply apparatus comprising, means for supporting a plurality of liquid sample containers, liquid take-off means movable sequentially into and out of each of said containers as the latter is moved relative thereto to withdraw at least portions of said liquid samples therefrom, and means to move said take-off means into and out of each of said containers, said liquid take-off means comprising a plurality of tubes each having a respective inlet and at a different vertical level for the flow of liquid sample portions therethrough when said inlet ends thereof are positioned in each of said containers at different vertical levels.

19. Liquid sample supply apparatus comprising, rotary turntable means for supporting a plurality of generally circular, concentric rows of liquid sample containers thereon, liquid take-off means positioned laterally of said support means and movable laterally thereof and into and out of said containers as the latter are moved relative thereto to withdraw at least portions of said liquid samples therefrom, and means to move said take-off means into and out of said containers, said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, a plurality of tubes supported from said support member, there being one such tube for each of said container rows with the respective inlet ends of said tubes each being movable into a container of a different said container row upon each movement of said take-off means to withdraw at least portions of said liquid samples from said containers.

20. Liquid sample supply apparatus comprising, rotary turntable means for supporting a plurality of generally circular, concentric rows of liquid sample containers thereon, liquid take-off means positioned laterally of said support means and movable laterally thereof and into and out of said containers as the latter are moved relative thereto to withdraw at least portions of said liquid samples therefrom, and means to move said take-off means into and out of said containers, said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, a plurality of tubes supported from said support member, there being one such tube for each of said container rows with the respective inlet ends of said tubes each being movable into a container row upon each movement of said take-off means to withdraw at least portions of said liquid samples from said containers, said means to move said tubes into and out of said containers comprising cam means rotatably supported from said support assembly, and cam follower means cooperatively associated with said generally parallelogram-like mechanism of said support arms and responsive to the rotation of said cam means to pivotally move said generally parallelogram-like mechanism about said support assembly to in turn move the inlet end of said tubes into and out of said sample containers.

21. Liquid sample supply apparatus comprising, means for supporting a plurality of liquid sample containers in each of a plurality of laterally spaced rows, liquid take-off means positioned laterally of said support means and movable laterally of said container rows to respective take-off positions relative thereto, and from said take-off positions, into and out of said containers to withdraw at least portions of said liquid samples therefrom, and means to relatively move said support means and said take-off means to position the latter in said take-off positions, in succession, relative to each of said rows, and to concurrently present the containers of the same said row, in succession, thereto for the withdrawal of the said liquid sample portions therefrom by the movement of said take-off means thereinto, said take-off means comprising a plurality of tubes with the respective inlet ends thereof being disposed at different levels within the same container upon each movement of said take-off means to withdraw at least portions of said liquid samples from said containers.

22. Liquid sample supply apparatus comprising, means for supporting a plurality of liquid sample containers in each of a plurality of laterally spaced rows, liquid take-off means positioned laterally of said support means and movable laterally of said container rows to respective take-off positions relative thereto, and from said take-off positions, into and out of said containers to withdraw at least portions of said liquid samples therefrom, and means to relatively move said support means and said take-off means to position the latter in said take-off positions, in succession, relative to each of said rows, and to concurrently present the containers of the same said row, in succession, thereto for the withdrawal of the said liquid sample portions therefrom by the movement of said take-off means thereinto, said liquid take-off means comprising a rotatable support assembly positioned laterally of said container support means, first and second support arms pivotally mounted at spaced points on said assembly and extending therefrom, a support member pivotally interconnecting said arms at points thereon spaced from said support assembly to form a pivotally interconnected, generally parallelogram-like mechanism therewith and with said support assembly, a plurality of tubes supported from said support member with the respective inlet ends thereof movable to different levels within the same container upon each movement of said take-off means to withdraw at least portions of said liquid samples from said containers.

23. Liquid sample supply apparatus comprising means for supporting a plurality of liquid sample containers, liquid take-off means movable into and out of said containers for withdrawing at least portions of said liquid samples therefrom, said liquid take-off means comprising a tube for the flow of said liquid samples into one end thereof and therethrough in one direction when said one end thereof is positioned in one of said containers, a source of a liquid other than said liquid samples, and means to flow said other liquid into the other end and through said tube in the direction opposite to said one direction when said one end is positioned elsewhere than in one of said containers.

24. Liquid sample supply apparatus comprising means for supporting a plurality of liquid sample containers, liquid take-off means movable into and out of said containers for withdrawing at least portions of said liquid samples therefrom, said liquid take-off means comprising a tube for the flow of said liquid samples into one end thereof and therethrough in one direction when said one end thereof is positioned in one of said containers, a receptacle for a liquid other than said liquid samples, means to move said take-off means into and out of said receptacle, and means to flow said other liquid into the other end and therethrough said tube in the opposite direction to discharge from said one end thereof when said one end of said tube is positioned in said receptacle.

25. Liquid sample supply apparatus comprising: means for supporting a plurality of liquid sample containers; liquid take-off means; means for relatively moving said support means and said take-off means to sequentially present each of said containers to said take-off means; means for moving said liquid take-off means to selected levels within a presented thereto container whereby a portion of the liquid at each such level may be taken-off.

References Cited by the Examiner

UNITED STATES PATENTS

| 3,081,158 | 3/1963 | Winter | 73—423 X |
| 3,143,393 | 8/1964 | De Seguin Des Hons. | |

LOUIS R. PRINCE, *Primary Examiner.*

S. CLEMENT SWISHER, *Assistant Examiner.*